United States Patent [19]
Walters

[11] 3,731,814
[45] *May 8, 1973

[54] LIQUID FILTER

[75] Inventor: Theodore M. Walters, Milford, N.J.

[73] Assignee: Charles H. Brown, New York, N.Y.

[*] Notice: The portion of the term of this patent subsequent to Jan. 27, 1987, has been disclaimed.

[22] Filed: May 9, 1968

[21] Appl. No.: 727,842

Related U.S. Application Data

[63] Continuation-in-part of Ser. No. 685,826, Nov. 27, 1967, Pat. No. 3,491,889.

[52] U.S. Cl. .................210/411, 210/415, 210/456
[51] Int. Cl. ............................................B01d 29/38
[58] Field of Search................210/411, 333, 413, 210/259, 326, 402, 456; 209/273, 306, 379, 389

[56] References Cited

UNITED STATES PATENTS

| | | | |
|---|---|---|---|
| 2,378,737 | 6/1945 | Simkovits | 210/415 |
| 2,534,161 | 12/1950 | Collins | 210/402 X |
| 2,899,069 | 8/1959 | Sandison | 210/456 X |
| 3,232,436 | 2/1966 | Nilsson | 210/415 X |
| 3,280,981 | 10/1966 | Renfrew | 210/456 X |
| 3,491,889 | 1/1970 | Walters | 210/415 |
| 1,946,500 | 2/1934 | Roberts | 210/489 X |
| 1,873,598 | 8/1932 | Jones | 210/259 X |
| 3,135,685 | 6/1964 | Tannea et al. | 210/259 X |
| 3,363,759 | 1/1968 | Pounder | 210/445 X |
| 3,367,506 | 2/1968 | Rosaen | 210/411 X |

Primary Examiner—Samih N. Zaharna
Attorney—Charles H. Brown

[57] ABSTRACT

A clear liquid filter for removing solid particles from a liquid or slurry comprises a chamber having a filtration screen. A washer arm is positioned adjacent the interior surface of the chamber and is relatively movable in a direction parallel to the filter screen surface. The washer arm may comprise a rigid imperforate plate in the interior of the chamber and positioned rather close to but spaced from the screen. Various kinds of washer arms are disclosed. The construction of the washer arm in one or more forms is such that it scoops up the liquid within the chamber and pushes the scooped-up liquid against the interior of the screen and outwards through the openings thereof as the relative motion of arm and screen continues. In another form, the washer arm is in the form of a tubular rotatable roller in direct contact with the interior surface of the chamber.

17 Claims, 15 Drawing Figures

Patented May 8, 1973
3,731,814
4 Sheets-Sheet 1
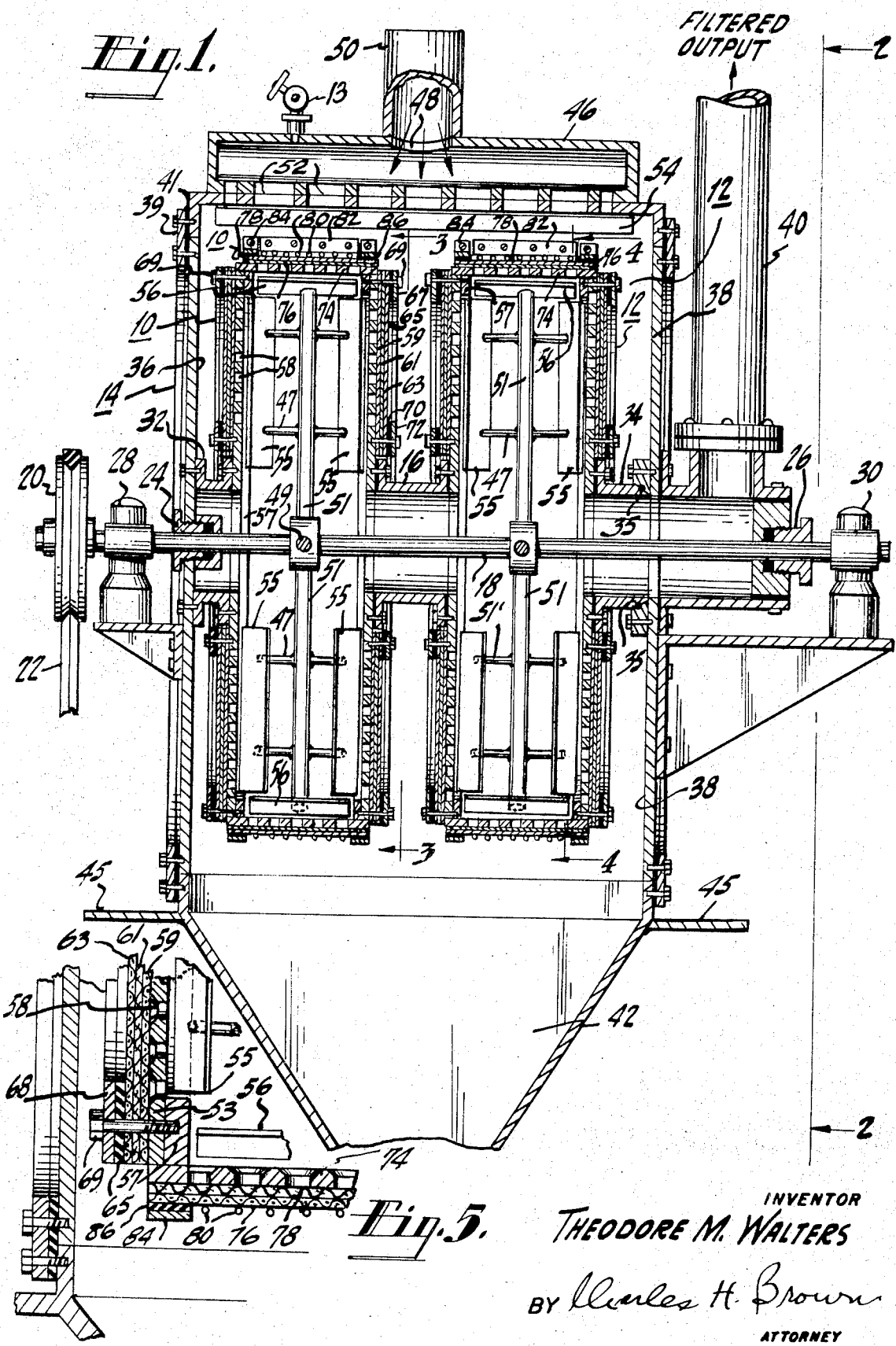
INVENTOR
THEODORE M. WALTERS
BY Charles H. Brown
ATTORNEY

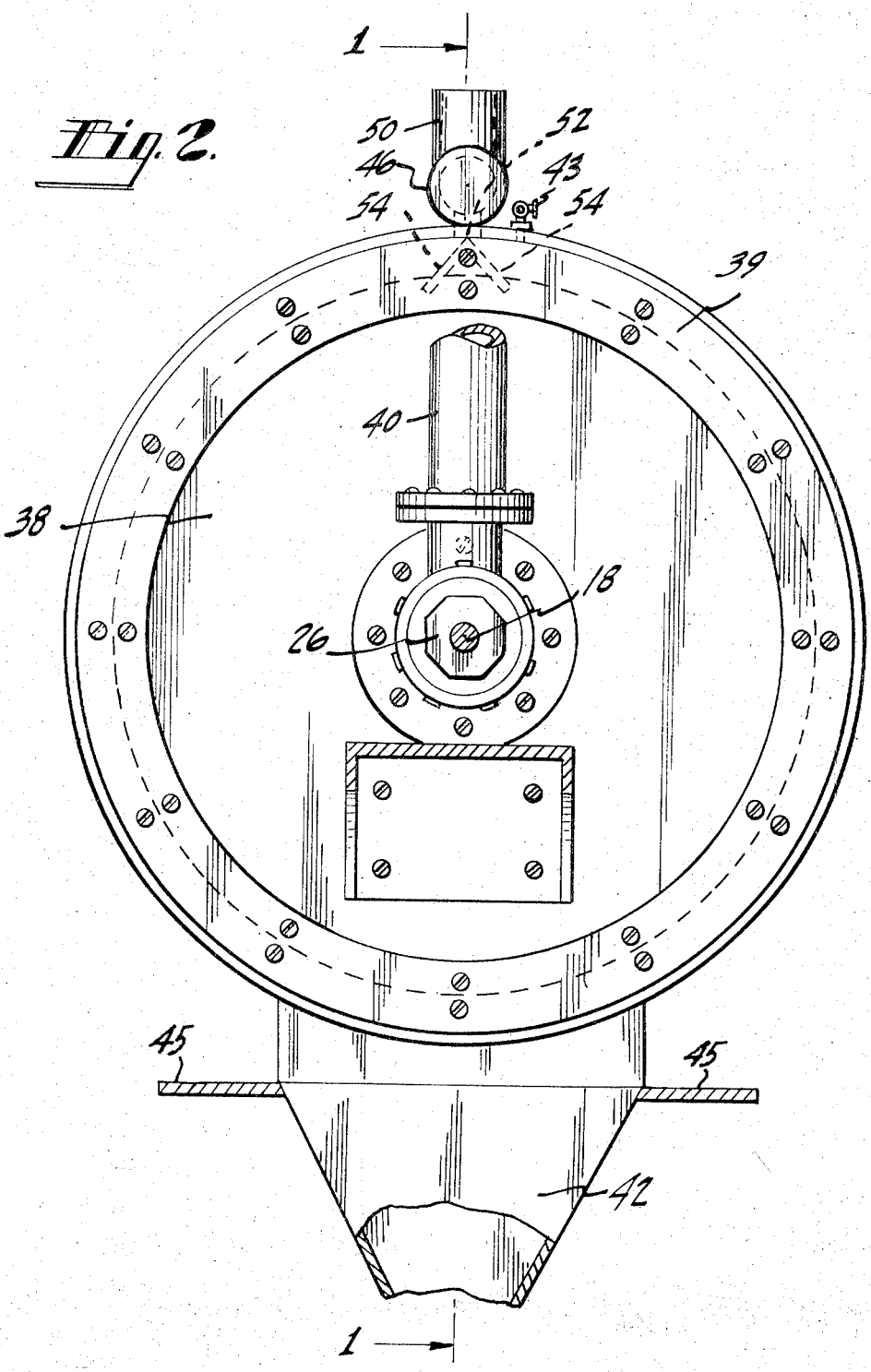

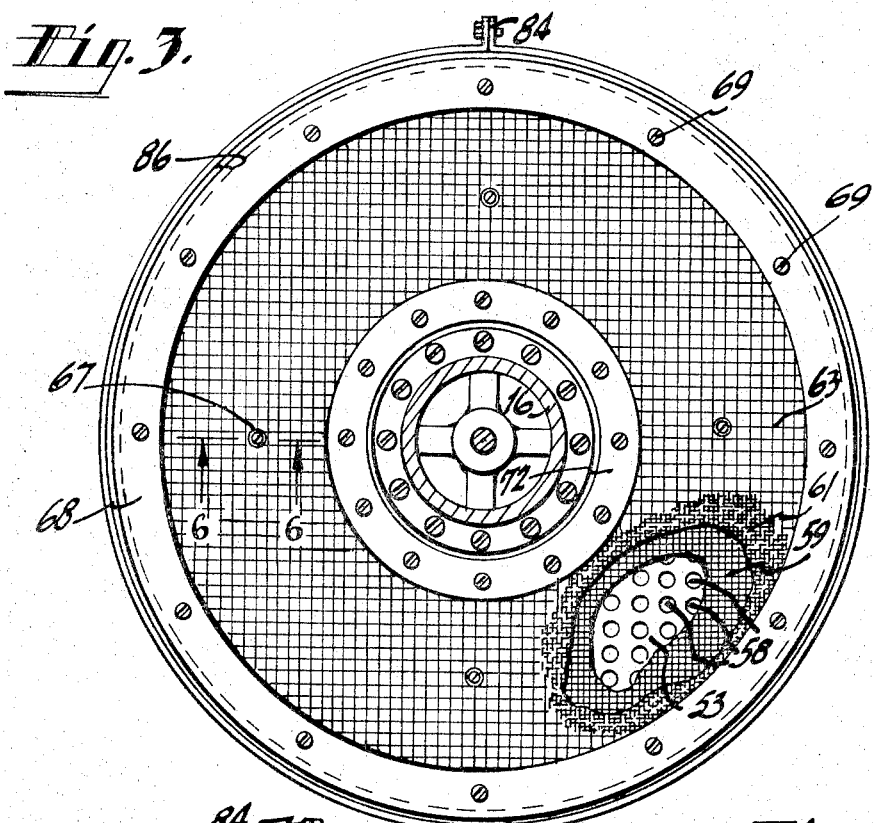

INVENTOR
THEODORE M. WALTERS
BY Charles H. Brown
ATTORNEY

LIQUID FILTER

The present application is a continuation-in-part of my copending application Ser. No. 685,826 filed Nov. 27, 1967, now U.S. Pat. No. 3,491,889, Jan. 27, 1970.

GENERAL

This invention is an improved clear liquid filter for straining solid matter such as fibers, dirt and other undesirable material from a flowing liquid. It is useful for many purposes such as, by way of example, for separating all of the pulp fibers from a liquid, or for delivering clean filtered liquids as water for drinking or to a swimming pool, or for recovering and reusing liquids from which solid particles have been removed.

In my copending application Ser. No. 685,826 filed Nov. 27, 1967, now U.S. Pat. No. 3,491,889, Jan. 27, 1970, there is disclosed a clear liquid filter in the form of an outer housing and an inner chamber or cylinder. The cylinder has a filter screen wound around it and held tightly in place thereon. One or more rotatable scoops or washer arms are positioned within the interior of the inner chamber close to the cylindrical filter screen for continually producing a back wash of liquid from the interior of the chamber out through the filter screen for dislodging solid particles tending to cling to the exterior of the filter screen. Means are provided for preventing separation of the filtration screen from the cylinder and the rupturing of the filtration screen as a result of the periodic pressure caused by the pulsating back wash wave. The result is an effective self-cleaning filter which automatically cleans the filter screen while the continuously rotating washer arm rotates within the interior of and close to the filter screen.

GENERAL DESCRIPTION OF INVENTION

The present invention enables a considerably greater controlled output flow of clean liquid over a much wider range of filter screen sizes as compared to the filter of the copending application. More specifically, the filter of the invention utilizes one or more drum-like inner chambers in which both the cylindrical surface and the flat circular surfaces of an inner chamber are provided with filter screens. The interior of the drum-like inner chamber is provided with washer arms adjacent to all filtration screens in such manner that relative motion of the arms to the drum causes the washer arms to squeeze out or scoop up the liquid within the drum and push this liquid outwardly through the screens, thereby dislodging any debris, dirt or fibers tending to cling to the exterior of the screens. In effect, the washer arms as they revolve produce a pulsating flow of liquid out through the screens from the inside out thereby effecting a continuous self-cleaning action. The speed of rotation of washer arms, and the surface area of the screens and the size of the openings or mesh of the screen are factors which enter into the controlled cleaning action. If the washer arms rotate too fast, then more liquid in the interior of the inner chamber flows out than is desired compared to the amount of liquid which enters through the screens and the effectiveness of the filter is diminished or ceases entirely. Stated another way, the washer arms should not be rotated faster than the water filters through the screen. If the washer arms rotate too slowly, the debris, particles or fibrous material collecting on the exterior of the screens are not removed and tend to mat or cake upon the screen.

A simple trial and error experiment easily determines the proper rotational speed for the chosen surface area of the screen and the size of the mesh.

According to an aspect of the invention, two or more of these drum-like inner chambers or filter sections of generally similar construction are placed in parallel — side by side (flat face to flat face) — to increase the amount of output flow of clean filtered liquid. A housing into which the liquid to be filtered is introduced encloses all inner chambers and a common output communicates with the interiors of all inner chambers.

BRIEF DESCRIPTION OF FIGURES OF DRAWING

A detailed description of the invention follows in conjunction with accompanying drawings, wherein:

FIG. 1 is a vertical section through one embodiment of a filter of the invention comprising two filter sections enclosed within a common housing;

FIG. 2 is a side view of the filter of FIG. 1 taken along line 2 — 2;

FIG. 3 is a sectional view of the filter of FIG. 1 taken along line 3 — 3;

FIG. 4 is a sectional view of the filter of FIG. 1 taken along the line 4 — 4;

FIG. 5 is an enlarged view of the bottom left end of FIG. 1 showing the constructional details of support for the flat and cylindrical screens and the manner of securing and sealing the component parts together;

FIGS. 10a to 10e show different geometrical cross-sectional shapes which the scoops (washer arms) may take, and FIG. 10f shows still another form which the scoop may take.

DETAILED DESCRIPTION

Figure 9:
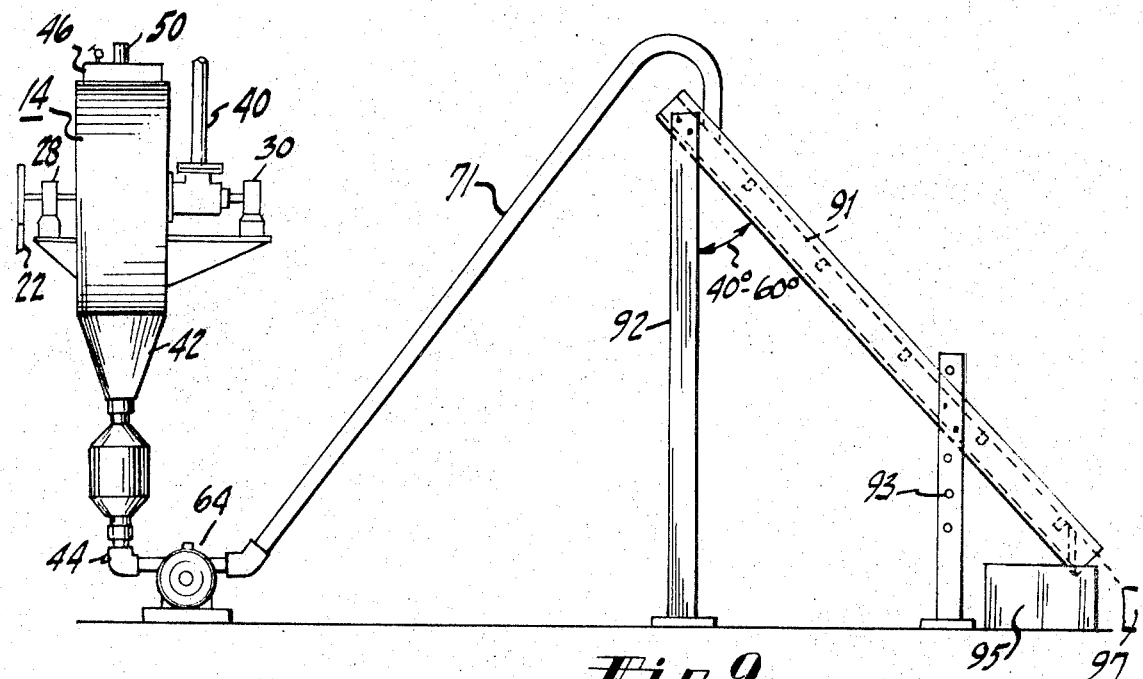
FIG. 9 shows the manner in which the solid particles, such as pulp fibers or debris removed from the filter of the invention, can be recovered for re-use if desired.

An embodiment of the invention comprises a pair of stationary filter sections 10 and 12 enclosed within a single stationary outer housing 14. The filter sections each comprise a drum-like hollow chamber having a cylindrical foraminous or perforate wall whose ends are enclosed by oppositely disposed foraminous or perforate walls also serving as filters. The two filter sections 10 and 12 are positioned side by side as shown in FIG. 1 with a hollow metallic spool or thimble 16 connected between them to enable their interiors to be in fluid communication for a common output. The embodiment illustrated in FIG. 1 is merely illustrative of one or any desired number of filter sections in multiple for feeding clean filtered water to a common output. Passing through the centers of both filter sections is a rotatable shaft 18 which is driven by suitable drive means such as a pulley 20 in the groove of which is placed a V-shape belt 22 driven by a motor not shown. Packing glands 24 and 26 and outboard bearings 28 and 30 are provided on opposite sides of the filter for suitable support purposes. The outside flat sides of the two filter sections 10 and 12 are secured by means of hollow metallic spools or thimbles 32 and 34 respectively to the metallic side walls 36 and 38 of the outer housing. Suitable metal seals with O rings 35 are provided at the junctions of the spools 32, 34 and the side walls of the outer housing.

The filtered liquid from the interiors of both filter sections is passed out through the clean liquid discharge pipe 40 in the direction of the arrow shown on this pipe. The debris or solid material which is removed from the incoming fluid is collected in funnel 42 at the bottom of the outer housing and washed out to a suitable drain pipe where the debris, if valuable, for example, pulp fibers, may be recovered for reuse or, if of no economic value whatever, passed along to a sewer. Support pads 45 serve to support the entire filter assembly.

The stationary outer housing comprises an outer cylindrical metal wall whose ends are closed by metal end cover or side plates 36 and 38. These cover plates are suitably sealed and are removable, as shown, to enable removal of the entire interior including filter sections. The bottom of the outer housing communicates over its entire length with funnel 42 to enable the sediment, fibers or solid particles to be washed out through a pipe 44 to a sewer or other disposal unit (See FIG. 9). The upper part of the outer housing is provided with an air vent which, by means of a manually operated valve 43, permits a reduction in air pressure in the interior of the outer housing shortly after the start of operation of the liquid filter of the invention. The inlet comprises an elongated metal cylinder or liquid distribution arrangement 46 which is attached to the stationary outer housing and closed except for the opening 48 at its top leading to the inlet feed pipe 50, and the multiple openings 52 at its bottom for distributing the incoming liquid substantially uniformly over the length of the cylindrical walls of the filter sections in the interior of the outer housing. The liquid distribution cylinder is provided with suitable end flanges to enable its attachment to the outer housing. The arrows in the pipe 50 and the interior of the metal cylinder 46 indicate the direction of the incoming liquid which is to be filtered. The inlet pipe 50 introduces the incoming liquid under pressure to the inlet distribution cylinder or box 46. A manually operated wash-out valve 13 enables the filter to be washed after it is shut down by supplying fresh or clear water to the distribution box thru the valve 13 from a pipe not shown.

Positioned below and attached to the upper part of the outer housing are a pair of metal angularly disposed liquid deflecting plates 54 for deflecting the liquid entering the outer housing from openings 52 into opposite directions on both sides of the cylinders of the cylindrical walls of the drum-like chambers of the filter sections 10 and 12. The deflecting plates 54 are angularly disposed to one another, for example at 90°, so that the incoming deflected liquid strikes the interior wall of the outer housing and does not directly strike the filter screen on the cylindrical wall of the filter section. Note FIG. 2.

Figure 8:
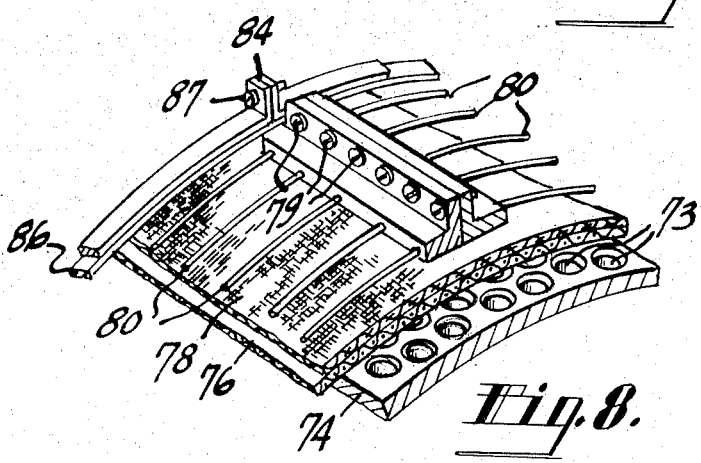
FIG. 8 is a perspective view, partly in section, of a circular portion of the cylinder of a filter section, showing the filter screen, the supporting larger mesh back wire screen, and the overlaying clamping wires for holding the filter screen firmly against the inner part of the cylinder.

The details of the stationary drum-like filter sections positioned in the interior of the stationary outer housing will now be described. Since both filter sections 10 and 12 are substantially identical in construction, only one of these will be described. Each filter section comprises a metal cylindrical wall 74 having a multiplicity of uniformly spaced holes 73. The cylinder wall 74 supports a fine liquid filtration cloth or screen 78 for filtering debris or solid particles from the incoming liquid. Note FIGS. 5 and 8. The very fine filtration screen 78 is mounted upon a thicker and very coarse back wire screen 76 whose apertures are considerably larger than the very fine and extremely small openings in the filter screen 78. To hold the filter screen tightly against the very wide mesh screen 76 and the inner cylinder 74 and to prevent rupturing of the filtration screen as the interiorly located washer arms produce a repeated pulsating type of back wash flow as they revolve there are provided a plurality of circularly arranged parallel wires 80 positioned over the filter screen and held firmly and rigidly in place by a pair of clamping bars 82 to which the ends of the wires 80 are attached. A multiplicity of holes in the clamping bars 82 accommodate screws or bolts 79 for tightening the bars 82 against each other. At both ends of the cylinder wall 74 there are provided rubber seals 86 held tightly in place by metal end clamps 84. A clamper bolt 87 holds each of the end clamps 84 securely in place.

Figure 6:
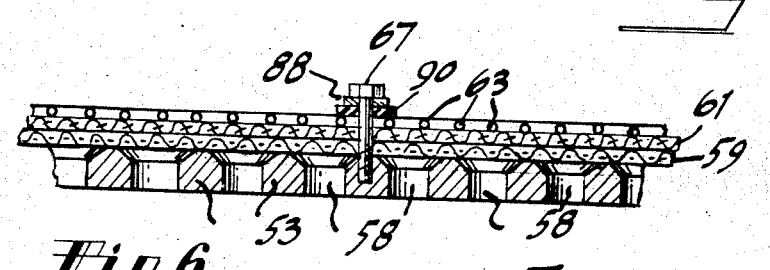
FIG. 6 is an enlarged sectional view of the flat screen surface of a drum as shown in FIG. 3, taken along the lines 6 — 6.

The metal cylinder wall 74 has its ends closed by two oppositely disposed flat circular disc-like metal side cover plates 53 provided with numerous substantially uniformly and closely spaced holes 58. The flat plates 53 each support a very fine liquid filtration cloth or screen 61 for filtering debris or solid particles from the incoming liquid. Note FIGS. 3, 5 and 6. The very fine filtration screen 61 is mounted upon a thicker and coarse back wire screen 59 whose apertures are considerably larger than the very fine and extremely small openings in the filter screen 61. To hold the filter screen tightly against the coarse screen 59 and the flat side plate 53 there is provided a square wire mesh 63 with relatively wide openings. A multiplicity of bolts 67 tightly secure the square wire mesh 63, the very fine filter cloth 61 and the backing wire screen 59 to the side plate 53. Under the head of each bolt 67 positioned between this head and the filter screen 61 are a metal washer 88 and a larger rubber washer 90, as shown in FIG. 6. Only a few such bolts 67 have been shown in FIG. 3 in the interest of simplicity of illustration although it should be understood that numerous such bolts and washers judiciously positioned will be employed to prevent the filter cloth 61 from tearing away from the square wire mesh 59 under the repetitious pulsating type of back wash as the washer arms positioned close to the flat side plate revolve in the interior of the drum-like chamber. An outer rubber sealing ring 65 is secured in place by an outer metal clamping ring 68, in turn, fastened to the assembly by a plurality of spaced bolts 69. An inner metal ring 57 is welded to the cylinder wall 74 at each end of the cylinder wall to secure bolts 69 to the drum-like filter section.

The holes 73 in the cylinder wall 74 and the holes 58 in the flat side plates 53 are very closely spaced so that there is as complete an area of filtration as possible through the filtration screen 61. To achieve filtration over almost 100 percent of the effective area of the filtration cloth or screen the holes 73 and 58 are counter-sunk (tapered) on those surfaces of wall 74 and plates 53 which directly contact the very wide mesh backing wire screen. Note FIGS. 5, 6 and 8. In an embodiment actually constructed, the thickness of the wall 74 was one-fourth inch thick, the holes 73 had a diameter of five-sixteenths inch and were counter-sunk to a depth of three thirty-seconds inch to provide a wider diameter of seven-sixteenths inch, as a result of which the top circular edges of the adjacent holes which directly engage the wide mesh backing wire were about one thirty-second inch apart. With such a construction the back wash liquid flowing through the holes 73 and 58 and through the backing wire screen affects substantially 100 percent of the area of the filtration screen 61. In the interest of clarity of illustration, the drawings show the spacing between adjacent holes 73 and between adjacent holes 58 to be wider apart than they should be in the clear liquid filter construction.

The axially positioned rotatable shaft 18 is provided in each drum-like chamber or filter section with a pair of rods 49 and 51 extending at right angles to each other and fixedly secured to the shaft at the centers of the rods, such that the rods 49, 51 revolve within the chamber as the shaft 18 rotates and is driven by the pulley 20. At both ends of each rod 49 and 51 there is provided a scoop in the form of an arcuate-shaped back-washer arm 56 which has a pair of parallel long edges which are parallel to the longitudinal axis of the rotatable shaft 18. These washer arm scoops are in one embodiment in the form of rigid metal plates which extend over substantially the entire effective length of the cylindrical wall 74 upon which is positioned the very fine filter cloth 78. Each scoop or back-washer arm shown in FIGS. 1, 4, 5 and 7, is skewed or in slanted relation to the cylindrical wall from which it is closely spaced and is so arranged that one long edge is closer to the cylindrical wall 74 than the other long edge as shown clearly in FIG. 4. Stated another way, one long edge of the back-washer arm is closer to the central axis or shaft 18 than the other long edge of the arm. By way of example one long edge of the washer arm may be spaced three-sixteenths inch from the closest point on the cylinder wall 74 whereas the other long of the washer arm may be spaced seven-eighths inch from the nearest point on the cylinder wall 74. The shaft 18 revolves in the direction of the arcuate arrows shown in FIG. 4 such that the arms 56 enable the liquid in the interior of the chamber to be scooped up, so to state, by the wider space long edge portion of the washer arm and forced against the inner wall of the cylinder at the location of the narrower-spaced long edge portion of the back-washer arm, thereby forcing or causing the water between the washer arm and the inner cylinder wall at the location of the washer arm to flow in an outward direction through the filter screen 78 and thereby clean the exterior surface of the screen 78 from solid particles tending the cling to the filter screen. As each back-washer arm scoop 56 periodically returns to the same position in the filter during each revolution of rod 51 or 49 there is a kind of pulsating back-washing effect at this position caused by each arm. Since there are two such back-washer arms at the ends of both orthogonally positioned rods 49 and 51, the cleansing of the cylindrical surface of the filter screen 78 is repeated four times per cycle of revolution of the shaft 18 and the back-washing of the filter screen 78 is continual and automatic during operation of the filter.

Figure 7:
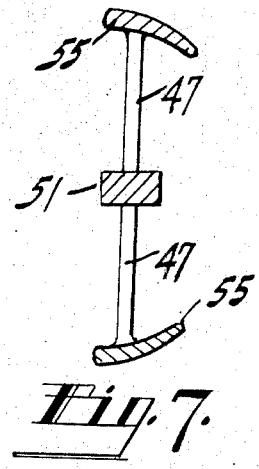
FIG. 7 is a sectional view taken along line 7 — 7 of FIG. 4.

Similar back-washing is achieved for the flat very fine filter screens 61 by means of substantially similar arcuate shaped back-washer arms 55, 55 which are fixedly secured to the rods 49 and 51 by means of relatively short rods 47, at right angles to rods 49, 51 as shown in FIGS. 1, 4 and 7. The orientation or skewing of the back-washer arms 55, 55 is such as to scoop up the water in the interior of the chamber at the location of the wider-spaced long edge of the washer arm and force the water against the inner surface of the flat metal circular plate 53, thereby causing the water between the washer arm and the flat plate at the location of the washer arm to flow in an outward direction through the filter screen 61 and thereby clean the exterior surface of the screen 61 from solid particles tending to cling to the filter screen as the rods 51 and 49 turn. It should be noted that there are two such back-washer arms 55 on each side of the rod 49 and 51 for the same flat plate 53, thereby making four washer arms 55, 55 for each flat plate 53. Each washer arm 55 has a length which is less than the radius of the flat circular-shaped plate 53.

Although the scoops or back washer arms 55 and 56 are shown to be arcuate in shape, obviously their contour or cross-sectional geometric shape may be different and may take any one of the shapes shown in FIG. 10a to 10f. The washer arms of FIGS. 10a to 10f are connected by the rigid rods 47 to the revolving rods 51, 49 or where these washer arms are at the extreme ends of the rods 51, 49 they are directly connected thereto in the manner illustrated in FIG. 1. The arrow adjacent each of these scoops or washer arms indicates the direction of movement of the arm relative to the cylindrical wall 74 or the flat wall 53. Where the washer-arm scoop is cylindrical or tubular in shape as shown in FIG. 10e, this arm may be spaced from the wall 53 or 74 and rigidly connected by rods to the revolving shaft 18 as are the arms 55 and 56. FIG. 10f shows the washer arm in the form of a tubular roller, preferably rubber coated on the outside surface and positioned directly against the wall 53 or 74 and mounted so as to rotate freely on bearings on each end of the tubular washer arm. The tubular washer arm of FIG. 10f is connected by means of a bifurcated construction 47' to the rods 47 or directly to the ends of revolving rods 49, 51. The bifurcated construction enables the roller to freely roll over the interior surface of the cylinder 74 or flat screen 53 as the rods 49, 51 revolve. It should be noted that at least a portion of the surface of the scoops 55, 56 and those of FIGS. 10a, 10c and 10e is arcuate and convex. The arcuate shape for the washer arms is preferred because this shape offers less resistance to the flow of water thereover, and hence less power is consumed in driving the shaft 18 and the washer arms during operation of the filter. Nor is the invention limited to the location of the inlet shown in the drawing, since it can be located elsewhere in the outer housing so as to set up a turbulence of incoming water within the outer housing. If desired, a portion of the incoming water under pressure can be made to strike the exterior of the thimble joining the two filter sections at an angle to prevent the building of a mat of debris on the thimble.

The use of filter screens on both flat walls and on the cylindrical wall of a filter section enables a greater amount of water to be filtered compared to a filter section having a filter screen on only the cylindrical wall as disclosed in my copending application, supra. By way of example only, each filter section may have a diameter ranging between from two feet to ten feet depending on the amount of water it is desired to filter and the desired rate of output flow of clean filtered water. The filter cloths or screens may have a mesh from 200 to 500 holes per inch. The clean water output in gallons per minute will depend on the effective square inch filter screen surface area and the size of the mesh. By placing filter sections in multiple as illustrated in the drawing and described herein the amount of clean water output is vastly increased for any size filter mesh. Clean water outputs can be obtained from 200 to 1,000 gallons per minute. The shaft may revolve at 300 revolutions per minute more or less depending upon the diameter of the filter section and the mesh of the filter cloth but not faster than the input water filters through the filter cloths. A 500 size mesh will filter particles of approximately 1 micron size. The differential water pressure between input and clean water output should be approximately around 10 pounds with the smaller water pressure in the clean water output but here again trial and error will determine the optimum water differential. An excessive differential water pressure will cause the filter cloth screens to burst.

Where it is desired to save valuable debris or solid particles, for example pulp fibers, the arrangement of FIG. 9 is used to collect the filtered-out pulp passed out from the funnel 42 and discharge pipe 44. A suitable metering pump 64 passes the pulp and water through a hose or conduit 71 on to the top of an angularly positioned screen 91. Screen 91 is supported by two posts 92 and 93. The lower end of screen 91 feeds a water collection box 95 while the pulp fibers are collected in a collection box 97. The water flowing in hose 71 and over the screen 91 passes through the screen 91, thereby being separated from the pulp fibers which tumble or snow-ball, so to state, from the top of the screen 91 and to the bottom of the screen 91 where they are collected. The optimum angle of the screen can be found by trial and error and may for example be 45° or in the range of 40° to 60° to the vertical. The screen 91 may be 2 feet or more wide, depending upon the quantity of the output, with flat boards at the sides and have a mesh of any desired size; for example 60 to 100 holes per inch depending on the particle size of the pulp to be salvaged. The apparatus of FIG. 9 from the output discharge pipe 44 to the pulp fiber collection box 97 may be considered as a thickener, in which case if thickening is primarily desired then the mesh of the filter cloths in the filter sections may be suitably increased.

In operating the clear liquid filter of the invention, only a relatively small amount of power is required to rotate the shaft and move the back washer arms efficiently. The pulsating wave produced by the back wash arms need produce only such pressure as to gently force any mat of pulp fibers or debris tending to form on the outside of the filtration screen from the exterior surface of the filtration screen, after which the pulp or debris will fall down to be collected in the reject funnel. It is not required for the pulsating back wash wave to exert such excessive outward force as to hurl the debris away from the filtration screen after such debris is dislodged from the filtration screen.

The term "washer arm" used in the appended claims, unless specifically limited to a particular contour, is deemed to include all of the geometrically-shaped cross-sectional configurations for the washer arms described in the specification and illustrated in the different figures of the drawing, and variations thereof within the spirit of the invention.

I claim:

1. A liquid filter for removing solid particles from a liquid, comprising a housing, a chamber within said housing having a flat foraminous surface having uniformly spaced openings therein and a filtration screen mounted upon and parallel to said surface, and a liquid scooper-type washer arm positioned and supported adjacent but spaced from said flat surface in the interior of said chamber and revolvable in a direction parallel to said surface and screen for producing a pulsating type of back wash wave, an inlet for introducing under pressure the liquid to be filtered into said housing, and means for preventing direct impingement of said liquid from said inlet against said filtration screen.

2. A filter according to claim 1 wherein said chamber is in the shape of a drum with a cylindrical surface the ends of which abut two oppositely disposed flat surfaces, and a revolvable rod centrally positioned within said drum for supporting said arm, each of said flat surfaces including a filter screen, there being a plurality of said liquid scooper-type washer arms mounted on but spaced from said rod in the interior of said drum and positioned in proximity to both of said screens.

3. A filter according to claim 2 including at least two of said washer arms symmetrically positioned on each side of said revolvable rod in proximity to but spaced from its associated filter screen.

4. A filter according to claim 1 wherein said chamber is in the shape of a drum, the cylindrical and flat surfaces of which have filter screens, a revolvable rod fixedly mounted on and at right angles to a rotatable shaft passing through the longitudinal axis of said drum for supporting said washer arm, and a washer arm at one end of said rod movable parallel to the cylindrical surface of said drum, said last arm having an edge near the cylindrical screen in proximity and parallel thereto but spaced therefrom and its opposite edge spaced further away from said cylindrical surface whereby said last arm also acts as a scoop as it moves and directs the liquid within the chamber against said cylindrical surface.

5. A filter according to claim 4, wherein said revolvable rod is fixedly mounted at its center to said shaft, there being similar washer arms at both ends of said rod in proximity to oppositely disposed portions of said cylindrical screen and each arranged as it moves to scoop up the liquid within said chamber and direct the scooped-up liquid against the interior of said cylindrical screen as said rod revolves.

6. A clear liquid filter for removing solid particles, comprising a drum-like chamber having a cylindrical foraminous metal surface closed at its ends by flat circular-shaped foraminous metal surfaces, filtration screens on said metal surfaces, a liquid scooper-type washer arm in the interior of said chamber extending over an appreciable portion of the length of said cylindrical surface, said washer arm being positioned adjacent to and parallel to said cylindrical surface, other liquid scooper-type washer arms within the interior of said chamber spaced from and adjacent said flat circular surfaces, means for causing the liquid to be filtered to flow toward said chamber, means for extracting the clear filtered liquid from the interior of said chamber, and means for imparting relative motion between said chamber and said washer arms in such direction that said arms direct a controlled flow of liquid in the interior of said chamber against the interior of said screens and through the openings thereof.

7. A liquid filter according to claim 6, including at least one additional substantially similar drum-like chambers positioned flat side to flat side but spaced from one another, a common output for all of said chambers communicating with the respective interiors of said chambers, a housing surrounding all of said chambers, and means for introducing the liquid to be filtered into said housing.

8. A liquid filter according to claim 6, wherein said chamber is stationary, a housing surrounding said chamber, an inlet for introducing the liquid to be filtered at a location adjacent the exterior of said cylindrical screen, and a liquid deflector in the interior of said housing and near said inlet and positioned between said inlet and said cylindrical screen, said deflector comprising two plates angularly disposed relative to each other for deflecting the liquid from the inlet into opposite directions on both sides of the chamber, said means for imparting relative motion between said chamber and said washer arms including a rotatable shaft in the center of said chamber, certain of said arms being mounted on said shaft by rods.

9. A liquid filter according to claim 6, including an additional substantially similar drum-like chamber spaced from said first chamber and positioned flat-side to flat-side relative thereto, a hollow tube between said two drum-like chambers and communicating with the respective interiors thereof, a common output arrangement (including said hollow tube) attached solely to one flat surface surface of one of said drum-like chambers and communicating with the interiors of both of said chambers, a housing surrounding both of said chambers, and an inlet for introducing the liquid to be filtered into said housing under pressure for impingement against the screens of both drum-like chambers.

10. A filter according to claim 9, including a liquid deflector between said inlet and said chambers, and means for preventing the accumulation of debris on the exterior of said hollow tube.

11. A filter according to claim 10, wherein said last means includes an element for directing a flow of liquid against said tube.

12. A liquid filter comprising a chamber having at least one flat wall provided with substantially uniformly spaced apertures, a filtration screen mounted upon said wall, a tubular washer arm contacting the interior of said wall and extending parallel to an appreciable portion of said wall, said tubular washer arm constituting a roller arranged to rotate during relative motion of said arm and wall to thereby force liquid which is within said chamber in an outward direction through the apertures of said wall and through said filtration screen, and means for supporting said arm and producing relative motion between said arm and wall.

13. A filter according to claim 12, wherein said chamber is stationary and there is provided a shaft in the interior of said chamber, said roller being driven by said shaft over said flat wall.

14. A clear liquid filter for removing solid particles, comprising a drum-like chamber having a cylindrical foraminous metal surface closed at its ends by flat circular-shaped foraminous metal surfaces, filtration screens on said metal surfaces, a washer arm in the interior of said chamber extending over an appreciable portion of the length of said cylindrical surface, said washer arm being positioned adjacent to and parallel to but spaced from said cylindrical surface, other washer arms within the interior of said chamber and adjacent said flat circular surfaces, means for causing the liquid to be filtered to flow toward said chamber, means for extracting the clear filtered liquid from the interior of said chamber, means for imparting relative motion between said chamber and said washer arms in such direction that said arms direct a controlled flow of liquid in the interior of said chamber against the interior of said screens and through the openings thereof, a stationary housing surrounding said chamber, an inlet for introducing under pressure the liquid to be filtered into said housing, a liquid deflector within said housing arranged to prevent direct impingement of the introduced liquid against said chamber, and means substantially uniformly spaced over the exteriors of said filtration screens for tightly holding said filtration screens against the respective metal surfaces.

15. A liquid filter for removing solid particles from a liquid, comprising a housing, a chamber within said housing having a flat surface having uniformly spaced openings therein and a filtration screen mounted upon and parallel to said surface, and a washer arm arranged and constructed to act as a liquid scoop positioned adjacent to but spaced from said flat surface in the interior of said chamber, means for positioning and supporting said arm adjacent said flat surface, and means for producing relative motion between said arm and flat surface in such direction that said arm produces a pulsating type of back wash wave as it travels over said flat surface, and an inlet for introducing under pressure into said housing the liquid to be filtered.

16. A clear liquid filter for removing solid particles, comprising a drum-like chamber having a cylindrical foraminous metal surface closed at its ends by flat circular-shaped foraminous metal surfaces, filtration screens on said metal surfaces, washer arms in the interior of said chamber extending over an appreciable portion of the length of said cylindrical surface, other washer arms within the interior of said chamber and adjacent to said flat circular surfaces, means for causing the liquid to be filtered to flow toward said chamber, means for extracting the filtered liquid from the interior of said chamber, and means including a rotatable shaft within said chamber and rods extending from said shaft to the washer arms adjacent to said cylindrical surface and other rods affixed at right angles to said first rods and extending to the washer arms adjacent said flat surfaces for imparting relative motion between said chamber and all of said washer arms in such direction and speed that said arms direct a controlled flow of liquid in the interior of said chamber against the interior of said screens and through the openings thereof.

17. A liquid filter comprising a housing, a chamber within said housing having a flat surface with substantially uniformly spaced openings therein and a filtration screen mounted upon and parallel to said surface, a rotatable shaft within said chamber, a washer arm positioned in proximity to but spaced from said flat surface in the interior of said chamber, a rod parallel to said shaft and located in the interior of said chamber and supporting said washer arm at one end of said rod, means linking said rod at its other end to said shaft so that said rod moves with rotation of said shaft, whereby rotation of said shaft produces relative motion between said arm and flat surface in such direction that the arm produces a pulsating type of back wash wave as it travels over said flat surface, and an inlet for introducing into said housing the liquid to be filtered.

* * * * *